(12) United States Patent
Kieffer et al.

(10) Patent No.: US 11,560,510 B2
(45) Date of Patent: Jan. 24, 2023

(54) AQUEOUS FRACTURING FLUID COMPOSITION AND FRACTURING PROCESS USING THE COMPOSITION

(71) Applicant: SPCM SA, Andrezieux Boutheon (FR)

(72) Inventors: Johann Kieffer, Andrezieux Boutheon (FR); Cédrick Favero, Andrezieux Boutheon (FR); Olivier Braun, Andrezieux Boutheon (FR); Thomas Divers, Andrezieux Boutheon (FR); Nicolas Boisse, Taixing (CN); Jing Ling, Taixing (CN); Kemin Xie, Taixing (CN)

(73) Assignee: SPCM SA, Andrezieux Boutheon (FR)

( * ) Notice: Subject to any disclaimer, the term of this patent is extended or adjusted under 35 U.S.C. 154(b) by 0 days.

(21) Appl. No.: 17/235,492

(22) Filed: Apr. 20, 2021

(65) Prior Publication Data
US 2021/0340431 A1    Nov. 4, 2021

(30) Foreign Application Priority Data

Apr. 30, 2020    (CN) .......................... 202010364366.2

(51) Int. Cl.
| | | |
|---|---|---|
| C09K 8/68 | (2006.01) | |
| C09K 8/80 | (2006.01) | |
| C08F 220/56 | (2006.01) | |
| E21B 43/267 | (2006.01) | |
| C09K 8/60 | (2006.01) | |
| C08F 226/02 | (2006.01) | |

(52) U.S. Cl.
CPC .............. *C09K 8/68* (2013.01); *C08F 220/56* (2013.01); *C08F 226/02* (2013.01); *C09K 8/602* (2013.01); *C09K 8/80* (2013.01); *E21B 43/267* (2013.01); *C08F 2800/10* (2013.01)

(58) Field of Classification Search
None
See application file for complete search history.

(56) References Cited

U.S. PATENT DOCUMENTS

| | | | |
|---|---|---|---|
| 3,727,689 A | 4/1973 | Clampitt | |
| 3,841,402 A | 10/1974 | Gogarty | |
| 3,888,312 A | 6/1975 | Gatlin | |
| 3,938,594 A | 2/1976 | Knight | |
| 4,033,415 A | 7/1977 | Githens | |
| 4,432,881 A | 2/1984 | Evani | |
| 4,801,389 A | 1/1989 | Brannon | |
| 6,281,172 B1 * | 8/2001 | Warren | C09K 8/24 507/119 |
| 2011/0118153 A1 | 5/2011 | Jeronimo | |
| 2012/0214714 A1 * | 8/2012 | Whitwell | C09K 8/88 507/224 |
| 2018/0298273 A1 * | 10/2018 | Favero | C09K 8/882 |
| 2020/0048535 A1 * | 2/2020 | Favero | C02F 11/147 |

FOREIGN PATENT DOCUMENTS

| | | |
|---|---|---|
| GB | 951147 A | 3/1964 |
| WO | 02084075 A1 | 10/2002 |
| WO | 02102917 A2 | 12/2002 |
| WO | 2008107492 A1 | 9/2008 |
| WO | 2010020698 A2 | 2/2010 |
| WO | 2013150203 A1 | 10/2013 |

OTHER PUBLICATIONS

Leteurtrois, Jean-Pierre et al., "Les hydrocarbures de roche-mere en France Rapport proviso ire," Conseil général de l'industrie l'environnement de l'énergie et des technologies, Apr. 2011, 56 pp.
Loveless, David et al., "Fracturing Fluid Comprised of Components Sourced Solely from the food Industry Provides Superior Proppant Transport," Abstract, https://doi.org/10.2118/147206-MS; Oct. 30, 2011, 2 pp.
King, George et al., "Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells," Society of Petroleum Engineers, International, SPE 152596, 2012, 80 pp.

* cited by examiner

*Primary Examiner* — John J Figueroa
(74) *Attorney, Agent, or Firm* — Heslin Rothenberg Farley & Mesiti P.C.

(57) ABSTRACT

Fracturing fluid comprising, in solution in water, a proppant and an associative amphoteric polymer, the said polymer and comprising:
- 0.01 to 10 mol % of at least one cationic monomer containing a hydrophobic chain,
- from 0.09 to 89.99 mol % of at least one anionic monomer,
- and from 10 to 99.9 mol % of at least one nonionic water-soluble monomer,
- the total amount of monomer being 100 mol %.

Fracturing process using this fluid.

20 Claims, No Drawings

AQUEOUS FRACTURING FLUID COMPOSITION AND FRACTURING PROCESS USING THE COMPOSITION

This application claims priority to Chinese Patent Application No. 202010364366.2 filed on Apr. 30, 2020, the entire contents of which are hereby incorporated herein by reference.

The invention relates to a novel fracturing fluid composition. More specifically, the invention relates to a novel aqueous fracturing fluid composition comprising at least one proppant and an associative amphoteric copolymer of high molecular weight.

The invention also relates to a novel process for fracturing unconventional oil and gas reservoirs using the said composition.

The production of oil and gas contained in unconventional reservoirs has increased in recent years and requires the opening of fractures in the reservoir for the economic production of the petroleum and gas.

The term "unconventional reservoirs" denotes deposits that require particular extraction techniques since they do not exist in the form of an accumulation of hydrocarbon (oil and/or gas) in a porous, permeable rock (cf Les hydrocarbures de roche-mère en France Rapport provisoire—CGIET no 2011-04-G—Ministère de l'écologie, du développement durable, des transports et du logement—April 2011 [Source rock hydrocarbons in France, interim report—CGIET No. 2011-04-G—Ministry of ecology, sustainable development, transportation and housing—April 2011]). For unconventional gas, mention may be made of shale gas, coal gas (coal bed methane) or compact reservoir gas (tight gas). For unconventional oil, mention may be made of heavy oil, shale oil or tight oil.

The reserves contained in unconventional reservoirs are enormous and extremely widespread in regions that were previously unexploited, for instance hydrocarbons such as shale gas, tight gas and coal bed gas. In the United States, shale gases are widely exploited and at the present time represent 46% of the total natural gas produced in the USA, whereas it represented only 28% in 1998. The very widespread basins are known under the names Barnett Shale, Ville Fayette Shale, Mowry Shale, Marcellus Shale, Utica Shale, etc. Exploitation of compact reservoirs was made possible by an evolution in drilling techniques.

Indeed, production techniques have evolved from vertical wells to horizontal wells, reducing the number of production wells necessary and their footprint on the land, and affording better coverage of the volume of the reservoir in order to recover a maximum amount of gas. However, the reservoir permeabilities are insufficient for the gas to migrate from the source rock to the well easily, and thus to enable the gas or petroleum to be produced economically and in quantity. It is thus necessary to increase the permeability and the production surfaces via stimulation operations and in particular via hydraulic fracturing of the rock in contact with the well.

Hydraulic Fracturing

The purpose of hydraulic fracturing is to create additional permeability and to enlarge the gas or petroleum production areas. Specifically, low permeability, natural barriers of compact layers and impermeabilization by drilling operations greatly limit production. The gas or oil contained in an unconventional reservoir cannot easily migrate from the rock to the well without stimulation.

These hydraulic fracturing operations using horizontal wells began in 1960 in the Appalachians. Today several thousands of operations have been performed in the USA. Reservoir modelling, drilling, cementation and stimulation techniques have become increasingly sophisticated and use equipment that makes it possible to perform these operations over increasingly shorter times with precise analysis of the results.

Reservoir Stimulation by Hydraulic Fracturing

These operations consist in injecting water at high pressure and at very high flow rate so as to create fractures distributed perpendicularly to the production wells. The process is generally performed in several steps in order to create fractures along the entire length of the horizontal well, allowing to cover a maximum volume of the reservoir.

In order to keep these fractures open, a proppant is added (sand, plastics or calibrated ceramics) so as to prevent closure of these fractures and to maintain the capillarity created once the injection is stopped.

Water alone is not sufficient to obtain good efficacy of placement of the proppant, due to its low viscosity. This limits its capacity to keep the proppant in place in the fractures. To overcome this problem, fracturing fluids containing viscosifying compounds have been developed.

By definition, a compound will be said to be viscosifying when it increases the viscosity of the solutions in which it is dissolved. Water-soluble polymers can be used as viscosifying compound.

In addition to having viscosifying properties, the compound must have a particular rheological profile. Specifically, the polymer must have a low viscosity at high shear rate so as not to impede the transportation and the pumping of the fluid containing the proppant during the injection of the fracturing fluid. Once injected, this same compound must be able to generate a sufficient viscosity when the shear decreases in order to support the proppant so as to keep it in the fractures.

The polymer must thus give the solution shear-thinning properties in order to have a relatively low viscosity during injection (at high shear) and a high viscosity when the shear decreases so as to keep the proppant in suspension in the fractures.

The viscoelastic properties of polymers in solution must also be taken into consideration. This viscoelasticity, and its importance in the application, is described in SPE 147206 (*Fracturing Fluid Comprised of Components Sourced Solely from the Food Industry Provides Superior Proppant Transport*—David Loveless, Jeremy Holtsclaw, Rajesh Saini, Phil Harris, and Jeff Fleming, SPE, Halliburton) via visual observations in static or dynamic experiments, or alternatively via rheological measurements, such as the measurement of the storage modulus and the loss modulus (G' and G"), or measurement on a rheometer of the viscosity as a function of the shear rate. Thus, elastic properties will be advantageous for ensuring the transportation and the suspension of the fracture proppant.

The choice of polymer is therefore not obvious and requires an in-depth rheological study in order to obtain satisfactory results.

Among the viscosifying compounds for aqueous solutions belonging to the prior art, mention may be made of natural substances such as guar gums and derivatives thereof such as hydroxypropyl guar (HPG) or carboxymethylhydroxypropyl guar (CMHPG); cellulose derivatives such as carboxymethylcellulose or hydroxyethyl cellulose. These compounds are especially described in U.S. Pat. Nos. 4,033,415, 3,888,312 and 4,801,389. In SPE 152596 (*Hydraulic Fracturing 101: What Every Representative, Environmentalist, Regulator, Reporter, Investor, University Researcher, Neighbor and Engineer Should Know About Estimating Frac Risk* and *Improving Frac Performance in Unconventional Gas and Oil Wells*—George E. King, Apache Corporation), the latest advances relating to the performance of fracturing fluids are discussed in detail.

However, these natural substances, and in particular guar derivatives, are also useful in other applications, such as the food or textile industry, and the growth in the exploitation of unconventional oil and gas resources is in competition with these other applications. This creates pressure on the availability of these products and leads to price problems.

Other petrochemistry-based compounds may have viscosifying properties. Mention may be made of synthetic polymers. Poly(meth)acrylamides, optionally partially hydrolysed, and poly(meth)acrylates and copolymers thereof are particularly known. These polymers develop viscosity thanks to of their molar mass and the inter-chain ionic repulsions. These polymers are described in patents GB 951 147, U.S. Pat. Nos. 3,727,689, 3,841,402 or 3,938,594. The mechanism governing the viscosity is linked to an increase in the hydrodynamic volume through intra-chain repulsions, inter-chain entanglements, etc.

However, in the presence of high salinity or at a high temperature, these polymers do not develop strong entanglements and repulsions, which is reflected by a strong decrease in their viscosity, especially after having undergone the shear of the pumping step. Moreover, these polymers generally do not have viscosifying properties that are sufficient to support the proppant in the fracture. The dose of these polymers needs to be increased to levels that are too high to obtain the suspension properties for the proppant. The dosage levels are not economically viable.

In order to improve the performance of the synthetic polymers mentioned previously, they were modified by introducing hydrophobic groups. The polymers thus obtained (comprising in minor amounts apolar units and in major amount units of hydrophilic nature) have associative properties. They require a high molecular mass and are characterized in that during their dissolution, their hydrophobic groups associate so as to limit the interactions with water. The drop in viscosity linked to the presence of electrolytes or high temperatures, which is a source of reduction of the hydrodynamic volume, is compensated by the increase of the inter-chain attractive interactions.

For the purpose of increasing these interactions, the polymers are favourably mixed with other compounds.

Most of the prior art documents describe the combination of associative polymers with surfactants in order to reinforce the inter-chain apolar associations or, on the contrary, to dissociate them by stabilization in order to promote intra-chain interactions.

In U.S. Pat. No. 4,432,881, a composition comprising a nonionic surfactant and a copolymer is claimed. The copolymer may be ionic or nonionic and comprises a monomer comprising a hydrophobic side chain, of at least 8 carbons.

Patent application WO 02/102917 discloses a thickening aqueous composition comprising one or more polymers formed:
from a nonionic monomer,
from an anionic monomer,
from a hydrophobic monomer.

The number of monomers composing the polymer is not limited. It is clearly explained that two monomers cannot have an opposite ionic charge, which means that the polymer is not amphoteric. In addition, one of the essential characteristics of the composition is that it provides thickening effect under a high shear rate and a poor thickening effect under a low shear rate, which is contrary to the object of the present invention.

Patent application WO 2013/150203 describes a fracturing fluid comprising a proppant and an associative amphoteric polymer wherein the cationic monomer has a specific structure. Despite an improvement of the rheological properties in fracturing fluid, there is still a need of improvement of these properties especially in harsh conditions such as high temperatures and high salinity reservoirs.

The Applicant has developed a novel aqueous fracturing fluid composition comprising a proppant and an associative amphoteric polymer comprising:
0.01 to 10 mol % of at least one cationic monomer containing a hydrophobic chain,
from 0.09 to 89.99 mol % of at least one anionic monomer,
and from 10 to 99.9 mol % of at least one nonionic water-soluble monomer;
the total amount of monomer being 100 mol %,
characterized in that the least one cationic monomer containing a hydrophobic chain has a general formula (I):

in which:
$R_1$ is an alkyl or arylalkyl chain consisting of 16 or 18 carbons,
X: a halide chosen from the group comprising bromide, chloride, iodide, fluoride, or a counterion of negative charge.

$R_1$ is preferably an alkyl chain ($C_nH_{2n+1}$) consisting of 16 or 18 carbons, more preferably $R_1$ is a linear alkyl chain consisting of 16 or 18 carbons. In other words, cationic monomer containing a hydrophobic chain may have an alkyl chain ($C_nH_{2n+1}$) wherein n=16, or an alkyl chain ($C_nH_{2n+1}$) wherein n=18. The ratio between the cationic monomer containing a hydrophobic chain wherein n=16 and the cationic monomer containing a hydrophobic chain wherein n=18 is comprised between 100:0 to 0:100.

When the associative amphoteric polymer of the invention contains some cationic monomers containing a hydrophobic chain having an alkyl chain (CnH2n+1) wherein n=16, and some others having alkyl chain (CnH2n+1) wherein n=18, the preferred ratio of the mixture of cationic monomer containing a hydrophobic chain wherein n=16 and cationic monomer containing a hydrophobic chain wherein n=18, is comprised between 90:10 and 60:40, more preferably between 80:20 and 70:30.

X is preferably chloride.

The term "arylalkyl chain" of the $R_1$ group means a branched or unbranched alkyl chain of 16 or 18 carbons, comprising one or more aromatic rings on its chain or pendant.

It has been found, surprisingly, that it is possible to obtain proppant properties that are superior to and more advantageous than those with the solutions of the prior art by using an amphoteric polymer based on at least one hydrophobic cationic monomer derived from acrylamide, based on at least one anionic monomer and based on at least one nonionic water-soluble monomer.

In particular, the fluids have improved rheological properties in that with a reduced dose of dissolved polymer, the fluids make it possible to achieve high levels of viscosity for shear rates of less than 20 s$^{-1}$ and low viscosities at 50 s$^{-1}$ or more. The fluid also has high yield viscosity values i.e. high viscosity plateau near the shear zero domain that are favorable for keeping proppants in suspension, thanks to the elastic property of the fluid.

The associative amphoteric polymer also allows to improve the suspending power of the proppants contained in the fracturing fluid compared to the polymers of the prior art.

The polymer of the invention is preferably water-soluble. As used herein, the term "water-soluble polymer" refers to a polymer which gives an aqueous solution without insoluble particles when it is added to water under agitation at 25° C. at a concentration of 10 g/L. The same definition applies to water-soluble monomers.

The anionic monomers that are useful in the present invention may be chosen from a broad group. It is preferably water-soluble. These monomers may present vinylic, for instance acrylic, maleic, fumaric or allylic functionalities and may contain one or more of a carboxylate, phosphonate, phosphate, sulfate or sulfonate group or another anionically charged group. The anionic monomer may be acidic or may be in the form of a salt or of the corresponding alkaline-earth metal or alkali metal of such a monomer. Examples of suitable monomers include acrylic acid, methacrylic acid, itaconic acid, crotonic acid, maleic acid, fumaric acid and monomers of strong acid type bearing, for example, a function of sulfonic acid or phosphonic acid type such as 2-acrylamido-2-methylpropanesulfonic acid, vinylsulfonic acid, vinylphosphonic acid, allylsulfonic acid, allylphosphonic acid, styrenesulfonic acid and the alkali metal, alkaline-earth metal and ammonium salts thereof.

The nonionic monomers that are useful according to the invention may be chosen from the group comprising water-soluble vinyl monomers. Preferred monomers belonging to this category are advantageously chosen from the group comprising acrylamide, methacrylamide, N-isopropylacrylamide, N,N-dimethylacrylamide, N-tert-butylacrylamide. N-vinylformamide, N-vinylacetamide, N-vinylpyridine and/or N-vinylpyrrolidone, acryloylmorpholine and acryloylpyrrolidone may also be used. Mention may also be made of alkyl-polyethylene glycol methacrylates. A preferred nonionic monomer will be acrylamide.

Preferably, the associative amphoteric polymer of the invention is in a dry form, as powder or as beads, or in a liquid form as inverse emulsion or aqueous dispersion (water in water emulsion).

The polymer according to the invention has preferably an average molecular weight by weight of at least 1 million g/mol, more preferably between 1 million g/mol and 30 million g/mol, even more preferably between 5 and 20 million g/mol. The average molecular weight by weight is preferably measured by Gel Permeation Chromatography (GPC) but can be measured by other conventional methods.

Unless otherwise specified, ppm are parts per million by weight.

According to a particular embodiment of the invention, the new aqueous composition of fracturing fluid can optionally comprise at least one surfactant, preferably in small amounts. Indeed, it has been surprisingly noticed that the association of said associative amphoteric polymer with a small amount of surfactant improves the viscosifying properties. In a preferred embodiment, the new aqueous fracturing fluid composition comprises up to 500 ppm of at least one surfactant.

According to this particular embodiment, the surfactant is preferably not the viscoelastic surfactant of WO02/084075.

The fracturing fluid may also contain one or more branching agents that react with the polymer after injection, for instance:
    a multivalent metal salt, preferably one or metal salts based on zirconium, aluminum or chromium,
    a post-grafting agent, preferably one or more of formaldehyde, glyoxal, polyethylenimines and ethyleneamines.

According to the invention, the polymer used is not crosslinked. Its structure may be linear, branched, star-shaped or comb-shaped. These structures may be obtained by free selection of the initiator and/or the transfer agents and/or the polymerization technique such as controlled radical polymerization, and/or the incorporation of structural monomers and/or the concentration, etc.

For instance, branching agents that are capable of copolymerizing with the monomers and preferably monomers containing multiple polyethylenically unsaturations may be used (containing at least two unsaturated functions), for instance vinyl, allylic, acrylic and epoxy functions, and examples that may be mentioned include methylenebisacrylamide (MBA), triallylamine and tetraallylammonium chloride The amphoteric associative polymers used in the invention are preferentially copolymers comprising:
    from 0.05 to 5 mol % of hydrophobic cationic monomer of formula (I),
    from 5 to 54.95 mol % of at least one anionic monomer, advantageously acrylic acid and/or methacrylic acid and/or 2-acrylamido-2-methylpropanesulfonic acid and/or salts thereof,
    and from 45 to 90 mol % of at least one water-soluble nonionic monomer, advantageously acrylamide and/or N-isopropylacrylamide and/or N—N-dimethylacrylamide and/or N-tert-butylacrylamide and/or N-vinylformamide and/or N-vinylpyrrolidone and/or acryloylmorpholine and/or acryloylpyrrolidone
    the total amount of monomer being 100 mol %.

The amphoteric associative polymers used in the invention are more preferentially polymers comprising:
    from 0.05 to 2 mol % of hydrophobic cationic monomer of formula (I),
    from 5 to 24.95 mol % of at least one sulfonated anionic monomer, preferably one or more of 2-acrylamido-2-methylpropanesulfonic acid and salts thereof,
    from 0 to 30 mol % of an anionic carboxylate monomer, preferably one or more of acrylic acid and salts thereof,
    and from 45 to 90 mol % of at least one water-soluble nonionic monomer, preferably acrylamide,
    the total amount of monomer being 100 mol %.

The Applicant has also developed a novel hydraulic fracturing process characterized by the injection of the said composition.

The composition of the fluid comprises at least one proppant, a viscosifying agent of polymeric type as above described and water, advantageously a brine.

The term "brine" denotes an aqueous solution comprising an amount of inorganic salts. Examples that may be mentioned include sodium, magnesium or calcium salts and the chloride, sulfate, carbonate, etc. counterions thereof.

The proppant, such as sand, ceramic, bauxite, glass beads or resin-impregnated sand, preferably represents from 0.5% to 40% by weight of the fluid, preferentially from 1% to 25% by weight of the fluid and even more preferentially from 1.5% to 20% by weight of the fluid.

The polymer of the present invention preferably represents between 0.05% and 20%, preferentially from 0.1% to 1% and even more preferentially from 0.1% to 0.75% by weight of the fluid.

The aqueous composition may comprise other compounds known to those skilled in the art such as summarized in SPE 152596:
- clay inhibitor agents such as potassium chloride or choline chloride,
- biocides to avoid the development of bacteria, in particular sulfate-reducing bacteria, which may form viscous masses that reduce the passage areas. Glutaraldehyde is the most commonly used, or alternatively formaldehyde or isothiazolinones, can be used as well,
- oxygen scavenger agents such as ammonium bisulfite to avoid the destruction of the other components by oxidation and corrosion of the injection tubes,
- anticorrosion additives to protect the tubes against oxidation by the residual amounts of oxygen. N,N-dimethylformamide is preferred,
- lubricants such as petroleum distillates,
- iron-chelating agents such as citric acid, EDTA or phosphonates,
- scale inhibitor products such as phosphates, phosphonates, polyacrylates or ethylene glycol,
- friction-reducing agents for reducing pressure drop in a turbulent medium and for greatly increasing the flow rate for an identical power and tube diameter.

The associative amphoteric polymers used in the invention do not require the development of a particular polymerization process. They may be obtained via any polymerization technique that is well known to those skilled in the art (solution polymerization, suspension polymerization, gel polymerization, precipitation polymerization, emulsion (aqueous or inverse) polymerization, optionally followed by a step of spray-drying, suspension polymerization, inverse suspension polymerization, micellar polymerization, optionally followed by a step of precipitation, post-hydrolysis or co-hydrolysis polymerization, radical "templates" polymerization or controlled radical polymerization.

The polymer is preferentially in powder, inverse emulsion or aqueous dispersion form. When it is in inverse emulsion or in aqueous dispersion form, it may be dissolved, either directly in brine or injection fluid, or using the method described in documents US 2011/0118153 which proposes the continuous online dissolution of inverse emulsions of water-soluble polymers.

When it is in powder form, this dissolution may take place, especially, by means of a unit as described in document WO 2008/107492, and sold by the Applicant under the reference PSU "Polymer Slicing Unit".

The compact and transportable installation described in patent application WO 2010/020698 is particularly suitable for fracturing operations.

A subject of the invention is also a process for fracturing an unconventional oil or gas reservoir, according to which:
- the fracturing fluid as described previously is prepared,
- the fluid is injected under pressure so as to create fractures distributed perpendicularly to the production well.

Optionally, after the creation of the fractures i.e. after injection of the fracturing fluid, at least one oxidizing compound and/or at least one surfactant compound is injected into the reservoir. Advantageously, a great amount of at least one surfactant compound will be injected.

The injection of surfactant, in great amounts, allows a strong reduction of the viscosity generated by the polymer by disrupting the inter-chain hydrophobic interactions, while the injection of the oxidizing compounds destroys the polymer. In both cases, it is possible to re-establish a fluid viscosity close to that of water.

When a surfactant is injected after the fracturing process, its concentration is at least 500 ppm, preferably at least 1000 ppm, and even more preferably at least 2000 ppm by weight of the aqueous solution injected after the formation of fractures.

Oxidizing compounds that may be mentioned include bleach, persulfates, permanganates and perchlorates. Delayed oxidizing compounds can be used as well.

The chemical nature of the surfactant compound(s) is not critical. They may be anionic, nonionic, amphoteric, zwitterionic and/or cationic. Preferably, the surfactant compound(s) of the invention contain anionic charges.

Preferably, the surfactant compounds used are chosen from anionic surfactants and zwitterions thereof chosen from the group comprising alkyl sulfate, alkyl ether sulfates, arylalkyl sulfate and arylalkyl ether sulfates, alkylsulfonates, alkyl ether sulfonates, arylalkylsulfonates, arylalkyl ether sulfonates, alkyl phosphates, alkyl ether phosphates, arylalkyl phosphates, arylalkyl ether phosphates, alkylphosphonates, alkyl ether phosphonates, arylalkylphosphonates, arylalkyl ether phosphonates, alkylcarboxylates, alkyl ether carboxylates, arylalkylcarboxylates, arylalkyl ether carboxylates, polyether alkyls, polyether arylalkyls, etc.

The term "alkyl chain" of the surfactant is defined as a branched or unbranched chain of 6 to 24 carbons, optionally comprising several moieties, which may optionally comprise one or more heteroatoms (O, N, S). The term "arylalkyl chain" of the surfactant defines a branched or unbranched chain of 6 to 24 carbons, comprising one or more aromatic rings and optionally comprising one or more heteroatoms (O, N, S).

The surfactants most commonly used, for reasons of cost, stability and availability, are of the sulfonate or sulfate type, which are in the form of alkali metal or ammonium salts.

The invention and the advantages resulting therefrom will emerge clearly from the following implementation examples.

EXAMPLES

1/Preparation of the Polymer by Gel Polymerization

In a beaker, dissolve x mol % of a hydrophobic cationic monomer, y mol % of acrylic acid, z mol % of acrylamide in water to obtain a 30 wt % active ingredient content. The aforementioned additives may advantageously be added at this point to improve the solubilization of the monomers. The sum of x+y+z is equal to 100. The solution is then stirred, cooled and neutralized by adding soda. The solution is then placed in a Dewar vessel and degassed with a nitrogen flow to remove oxygen.

Polymerization is initiated using Ter-butyl hydroperoxide/sodium persulfate as red/ox pair. The temperature rises adiabatically.

The resulting polymer is then isolated by filtration, dried, grinded and sieved to obtain a powder.

The polymers of the present invention are numbered from 1 to 4. The respective comparative polymers made according to WO 2013/150203 are numbered from 5 to 8. For comparative purposes, a non-associative anionic polymer of very high molar mass is also evaluated: polymer 9, an amphoteric and non-associative polymer as described in WO 02/084075: polymer 10, The monomeric composition of polymers 1 to 10 is described in table 1.

TABLE 1

Monomeric composition of polymers 1 to 10 in mol %.

| Products | AM | ANa | ATBS Na | DADMAC | Associative monomer of the invention, $R_1$ = C16 linear alkyl chain | Associative monomer of $C_{12}H_{25}$ type described in WO 2013/150203 | Mw (millions g/mol) |
|---|---|---|---|---|---|---|---|
| Polymer 1 (Invention) | 85 | 14.8 | 0 | 0 | 0.2 | 0 | 6-8 |
| Polymer 2 (Invention) | 85 | 0 | 14.8 | 0 | 0.2 | 0 | 4-7 |
| Polymer 3 (Invention) | 85 | 4.8 | 10 | 0 | 0.2 | 0 | 7-10 |
| Polymer 4 (Invention) | 80 | 4.8 | 15 | 0 | 0.2 | 0 | 6-8 |
| Polymer 5 (Comparative) | 85 | 14.8 | 0 | 0 | 0 | 0.2 | 6-8 |
| Polymer 6 (Comparative) | 80 | 0 | 14.8 | 0 | 0 | 0.2 | 4-7 |
| Polymer 7 Comparative) | 85 | 4.8 | 10 | 0 | 0 | 0.2 | 7-10 |
| Polymer 8 (Comparative) | 80 | 4.8 | 15 | 0 | 0 | 0.2 | 6-8 |
| Polymer 9 (Comparative) | 75 | 25 | 0 | 0 | 0 | 0 | 18-20 |
| Polymer 10 (Comparative) | 80 | 18 | 0 | 2 | 0 | 0 | 6-8 |

AM: Acrylamide
ANa: Sodium Acrylate
DADMAC: Diallyl dimethyl Ammonium Chloride
ATBS Na: Sodium acrylamido-tert-butyl sulfonate 2/Preparation of the Aqueous Polymer Solution The dry extract of the polymer is determined in order to know the percentage of active material: weigh accurately to within 0.001 g a glass vial. Note this mass $M_C$. Weigh out 10 g of powder in a glass vial and notes the cumulative mass $M_{C+P}$. Place this glass vial in an oven at 120° C. for 2 hours. After the 2 hours at 120° C., allow the vial to cool in a desiccator. Weigh the vial with the mass of dry recovered solid, noted $M_{C+PS}$. The percentage of dry matter X is given by the calculation:

$X = [(M_{C+PS} - M_C)/(M_{C+P} - M_C)] * 100$ expressed as a percentage

The polymer solution is prepared according to the following general protocol:
Preparation of a Stock Solution Containing 10 g/L of Polymer (Product of the Invention or Guar Gum in Powder Form)

Weigh out 200-(20/(X/100)) g of brine, representative of the injection water used on a fracturing field, in a 400 mL beaker. Using a mechanical stirrer, stir the solution at a speed of 500 rpm. 20/(X/100) g of dry polymer in powder form are added slowly in the vortex wall formed by the stirring at room temperature. The solution is left stirring for 2 hours. Dilution of the Stock Solution to Obtain a Solution Diluted to a Final Polymer Concentration of Y %

Y*100 g of the 10 g/L stock solution are taken up by syringe and transferred into a 400 mL beaker. 100-Y g of brine prepared beforehand are added to beaker. The solution is then stirred using a magnetic bar at 250 rpm for 20 minutes.

3/Rheological Evaluation of the Polymers

Polymers 1 et 10 and a guar gum Ecopol™ 500 are evaluated. This guar gum corresponds to guar gum used on fracturing fields in the United States.

The rheological properties are determined using for example a Malvern Bohlin Gemini rheometer with cone/plate geometry of angle 2°, 6 cm in diameter. A Peltier heating and cooling system is used to be able to take measurements at different temperatures.

The polymers and the guar gum are tested at two temperatures: 40° C. and 70° C., and in two different brines. The first brine contains 10 g/L of NaCl and 2 g/L of $CaCl_2$, and the second brine contains 40 g/l of NaCl and 4 g/L of $CaCl_2$. The polymer concentration is 2000 ppm by weight. For each rheological test the viscosity at shear rates of 1 $s^{-1}$ and 10 $s^{-1}$ are noted such as the viscosity loss in percentage, and Table 2 to 5 recapitulate the results in each condition.

TABLE 2

Viscosity at 40° C. with brine 10 g/L of NaCl and 2 g/L of $CaCl_2$.

|  | Viscosity at 1 $s^{-1}$ | Viscosity at 10 $s^{-1}$ | Viscosity loss (%) |
|---|---|---|---|
| Polymer 1 | 290 | 195 | 32.8 |
| Polymer 2 | 580 | 400 | 31 |
| Polymer 3 | 1160 | 760 | 34.5 |
| Polymer 4 | 2070 | 1350 | 34.8 |
| Polymer 5 | 210 | 80 | 61.9 |
| Polymer 6 | 450 | 210 | 53.3 |
| Polymer 7 | 890 | 350 | 60.7 |
| Polymer 8 | 1550 | 420 | 72.9 |
| Polymer 9 | 90 | 44 | 51.1 |
| Polymer 10 | 74 | 36 | 51.4 |
| Ecopol ™ 500 | 40 | 18 | 55 |

TABLE 3

Viscosity at 70° C. with brine 10 g/L of NaCl and 2 g/L of CaCl$_2$.

| | Viscosity at 1 s$^{-1}$ | Viscosity at 10 s$^{-1}$ | Viscosity loss (%) |
|---|---|---|---|
| Polymer 1 | 221 | 156 | 29.4 |
| Polymer 2 | 671 | 450 | 32.9 |
| Polymer 3 | 957 | 620 | 35.2 |
| Polymer 4 | 1612 | 1050 | 34.9 |
| Polymer 5 | 168 | 72 | 57.1 |
| Polymer 6 | 360 | 170 | 52.8 |
| Polymer 7 | 712 | 290 | 59.3 |
| Polymer 8 | 1240 | 150 | 63.7 |
| Polymer 9 | 72 | 36 | 50 |
| Polymer 10 | 59.2 | 28 | 52.7 |
| Ecopol™ 500 | 32 | 14 | 56.3 |

TABLE 4

Viscosity at 40° C. with brine 40 g/L of NaCl and 4 g/L of CaCl$_2$.

| | Viscosity at 1 s$^{-1}$ | Viscosity at 10 s$^{-1}$ | Viscosity loss (%) |
|---|---|---|---|
| Polymer 1 | 196 | 141 | 28.1 |
| Polymer 2 | 413 | 279 | 32.4 |
| Polymer 3 | 800 | 525 | 34.4 |
| Polymer 4 | 1503 | 1010 | 32.8 |
| Polymer 5 | 147 | 62 | 57.8 |
| Polymer 6 | 315 | 138 | 56.2 |
| Polymer 7 | 623 | 235 | 62.3 |
| Polymer 8 | 1085 | 410 | 62.2 |
| Polymer 9 | 63 | 31 | 50.8 |
| Polymer 10 | 51.8 | 25 | 51.7 |
| Ecopol™ 500 | 28 | 13 | 53.6 |

TABLE 5

Viscosity at 70° C. with brine 40 g/L of NaCl and 4 g/L of CaCl$_2$.

| | Viscosity at 1 s$^{-1}$ | Viscosity at 10 s$^{-1}$ | Viscosity loss (%) |
|---|---|---|---|
| Polymer 1 | 185 | 122 | 34.1 |
| Polymer 2 | 384 | 251 | 34.6 |
| Polymer 3 | 678 | 450 | 33.6 |
| Polymer 4 | 1365 | 890 | 34.8 |
| Polymer 5 | 126 | 54 | 57.1 |
| Polymer 6 | 270 | 118 | 56.3 |
| Polymer 7 | 534 | 210 | 60.7 |
| Polymer 8 | 930 | 356 | 61.7 |
| Polymer 9 | 54 | 25 | 53.7 |
| Polymer 10 | 44.4 | 21 | 52.7 |
| Ecopol™ 500 | 24 | 11 | 54.2 |

From these results, we note that all conditions being equal, the use of the hydrophobic cationic monomer of the invention allows a significant improvement of the rheological properties of the polymers of the prior art. More precisely, in all conditions of salinity and temperature, when polymers 1 to 4 are compared to respective polymer 5 to 8, it is showed that the performances are improved.

The polymers of the invention (1 to 4) give better results in terms of rheologic properties in all the conditions compared to the polymer 9 and 10. They are also better than the guar gum Ecopol™ 500.

The polymers of the invention also offer lower viscosity loss than the prior art polymers. Viscosity loss is below 35% for polymers 1 to 4, whereas the viscosity loss is always higher than 50%, sometimes higher than 60% for prior art polymers. A lower viscosity between the viscosity at 1 s$^{-1}$ and viscosity at 10 s$^{-1}$ is favorable in the fracturing operation because the polymer has a more stable behavior in the formation and gives better and more predictable performances.

In contrast, it is known that at a higher shear rate stage, it is better to have low viscosity to ensure good pumping properties. It has been found that at high shear rate (50 s$^{-1}$ to 100 s$^{-1}$), the viscosities are low for all the evaluated products.

These results show that the polymers of the invention (1 to 4) are very good candidates for fracturing application because they are able to keep the proppant in suspension, even when the temperature and the salinity of the reservoir are high and ensure good pumping of the injected fluid.

4/Degradation of the Viscosity by Adding Surfactant After Fracturing

During the production step, once the sand has been inserted, the viscosity of the polymer must be lowered in order to facilitate the placing of the sand in the fractures. Generally, the injection of oxidizing agent is used to destroy the polymer and to re-establish a fluid viscosity close to that of water.

In order to demonstrate the impact of the surfactants on the polymer solutions in the presence of sand, the same sedimentation protocol was used. A 10 wt % solution of surfactant (sodium dodecyl sulfate (SDS)) is added (5 g, i.e. 2000 ppm) with stirring 30 seconds before the transfer into the measuring cylinder. The time corresponding to total sedimentation of the sand is recorded and is given in the following table 6:

TABLE 6

Sedimentation Test with SDS.

| Products | Sedimentation time for the 20 g of sand |
|---|---|
| Ecopol 500 | Less than 2 minutes |
| Polymer 1 | Less than 2 minutes |
| Polymer 2 | Less than 2 minutes |
| Polymer 3 | Less than 2 minutes |
| Polymer 4 | Less than 2 minutes |
| Polymer 5 | Less than 2 minutes |
| Polymer 6 | Less than 2 minutes |
| Polymer 7 | Less than 2 minutes |
| Polymer 8 | Less than 2 minutes |
| Polymer 9 | Less than 2 minutes |
| Polymer 10 | Less than 2 minutes |

It is noted by comparing this table with the preceding results that the addition of a sufficient quantity of SDS after fracturing drastically reduces the sand sedimentation time. It is thus advantageous to use the polymer of the present invention for its sand proppant properties, but also for the ease of subsequently reducing the viscosity of the solution by adding surfactant after fracturing.

It is to be noted that the same very good performances, superior to the prior art polymers, are obtained with the same associative monomer wherein R$_1$=C18 linear alkyl chain, and with mixtures of thereof.

The invention claimed is:
1. A fracturing fluid comprising a proppant and an associative amphoteric polymer, the said polymer comprising:
0.01 to 10 mol % of at least one cationic monomer containing a hydrophobic chain;
from 0.09 to 89.99 mol % of at least one anionic monomer;
and from 10 to 99.9 mol % of at least one nonionic water-soluble monomer;
the total amount of monomer being 100 mol %, wherein the at least one cationic monomer containing a hydrophobic chain has general formula I:

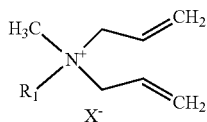

in which:
R$_1$ is an alkyl or arylalkyl chain of 16 to 18 carbons,
X is a halide chosen from the group consisting of bromide, chloride, iodide, fluoride, and a counterion of negative charge.

2. The fracturing fluid according to claim 1, comprising up to 500 ppm of at least one surfactant.

3. The fracturing fluid according to claim 2, wherein R$_1$ is a linear alkyl chain of 16 to 18 carbons.

4. The fracturing fluid according to claim 1, wherein R$_1$ is an alkyl chain of from 16 to 18 carbons.

5. The fracturing fluid according to claim 4, wherein R$_1$ is a linear alkyl chain of 16 to 18 carbons.

6. The fracturing fluid according to claim 1, wherein X is chloride.

7. The fracturing fluid according to claim 1, wherein the proppant is chosen from the group consisting of sand, ceramic, bauxite, glass beads and resin-impregnated sand.

8. The fracturing fluid according to claim 1, wherein the proppant represents from 0.5% to 40% of the fluid.

9. The fracturing fluid according to claim 8, wherein the proppant represents from 1% to 25% of the fluid.

10. The fracturing fluid according to claim 9, wherein the proppant represents from 1.5% to 20% by weight of the fluid.

11. The fracturing fluid according to claim 1, wherein the associative amphoteric polymer represents from 0.05% to 2% by weight of the fluid.

12. The fracturing fluid according to claim 11, wherein the associative amphoteric polymer represents from 0.1% to 1% by weight of the fluid.

13. The fracturing fluid according to claim 12, wherein the associative amphoteric polymer represents from 0.1% to 0.75%, by weight of the fluid.

14. The fracturing fluid according to claim 1, wherein the associative amphoteric polymer has an average molecular weight by weight comprised between 1 million g/mol and 30 million g/mol.

15. The fracturing fluid according to claim 1, wherein the anionic monomer is selected from the group consisting of acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid, styrenesulfonic acid, alkali metal, alkaline-earth metal and ammonium salts thereof, and mixtures thereof.

16. The fracturing fluid according to claim 1, wherein the nonionic monomer is selected from the group consisting of acrylamide, methacrylamide, N-isopropylacrylamide, N,N-dimethylacrylamide, N-tert-butylacrylamide, N-vinylformamide, N-vinylacetamide, N-vinylpyridine and/or N-vinylpyrrolidone, acryloylmorpholine, acryloylpyrrolidone, alkyl-polyethylene glycol methacrylates, and mixtures thereof.

17. The fracturing fluid according to claim 1, wherein the associative amphoteric polymer comprises:
from 0.05 to 5 mol % of hydrophobic cationic monomer of formula (I),
from 5 to 54.95 mol % of at least one anionic monomer selected from acrylic acid, methacrylic acid, 2-acrylamido-2-methylpropanesulfonic acid, and salts thereof,
and from 45 to 90 mol % of at least one water-soluble nonionic monomer selected from acrylamide, N-isopropylacrylamide, N-N-dimethylacrylamide, N-tert-butylacrylamide, N-vinylformamide, N-vinylpyrrolidone, acryloylmorpholine, and acryloylpyrrolidone,
the total amount of monomer being 100 mol %.

18. The fracturing fluid according to claim 1, wherein the associative amphoteric polymer comprises:
from 0.05 to 2 mol % of hydrophobic cationic monomer of formula (I),
from 5 to 24.95 mol % of 2-acrylamido-2-methylpropanesulfonic acid or a salt thereof,
from 0 to 30 mol % of acrylic acid or a salt thereof,
and from 45 to 90 mol % of acrylamide,
the total amount of monomer being 100 mol %.

19. A process for fracturing an unconventional oil or gas reservoir, said process comprising:
preparing the fracturing fluid according to claim 1, and
injecting the fracturing fluid according to claim 1 into an oil or gas reservoir under pressure so as to create fractures distributed perpendicularly to a production well.

20. The process according to claim 19, wherein, after said injecting the fracturing fluid, at least one oxidizing compound and/or at least one surfactant is then injected into the reservoir.

* * * * *